United States Patent [19]

Oren et al.

[11] Patent Number: 5,183,546
[45] Date of Patent: Feb. 2, 1993

[54] OPTIMIZED MULTIPOROUS CARBON BED FOR ELECTROCHEMICAL FILTERS

[75] Inventors: Yoram Oren; Haim Cohen, both of Beer-Sheva; Abraham Soffer, Arad, all of Israel

[73] Assignee: State of Israel, Israel Atomic Energy Commission, Beer-Sheva, Israel

[21] Appl. No.: 593,387

[22] Filed: Oct. 2, 1990

Related U.S. Application Data

[63] Continuation of Ser. No. 464,723, Jan. 16, 1990, abandoned, which is a continuation of Ser. No. 199,176, May 26, 1988, abandoned.

[30] Foreign Application Priority Data

May 29, 1987 [IL] Israel .................................. 82706

[51] Int. Cl.$^5$ .............................................. B01D 39/00
[52] U.S. Cl. ................................ 204/290 R; 204/294; 204/295; 210/502.1; 210/505
[58] Field of Search ............... 204/130, 149, 151, 152, 204/242, 276, 279, 282, 295, 301, 302, 20, 290 R, 294; 427/113, 122, 244; 210/243, 502.1, 505

[56] References Cited

U.S. PATENT DOCUMENTS 4,548,695 10/1985 Bridger et al. ...................... 204/284

FOREIGN PATENT DOCUMENTS 0026995 4/1981 European Pat. Off. ........ 204/290 R
2905168 7/1980 Fed. Rep. of Germany ...... 427/122
0022067 7/1978 Japan ................................... 427/122

Primary Examiner—John Niebling
Assistant Examiner—Kathryn Gorgos
Attorney, Agent, or Firm—Jacobson, Price, Holman & Stern

[57] ABSTRACT

An electrochemical filter which consists of a fibrous electrically conducting material to which there are bonded microscopic particles of carbon or active charcoal. A variety of fibers can be used: carbon fibers, graphite fibers, fibers of inert metal etc. A process for the production of such filters where the particles are bonded to the fibers by a pyrolyzable binder which is pyrolyzed. Electrochemical separation and filter devices based on such filter media.

4 Claims, 3 Drawing Sheets

OPTIMIZED MULTIPOROUS CARBON BED FOR ELECTROCHEMICAL FILTERS

This application is a continuation of application Ser. No. 07/464,723, filed on Jan. 16, 1990 now abandoned, which is a continuation of prior application Ser. No. 07/199,176, filed on May 26, 1988, now abandoned.

FIELD OF THE INVENTION

The invention relates to novel filter media for use in a variety of processes, such as electrochemical separations and filtrations.

There are provided electrochemical filter composites which are based on a matrix of electrically conducting fibers, to which there are firmly bonded microscope size particles of carbon or graphite, which particles substantially increase the overall surface area of the filter.

The invention further relates to a process for producing such composite filters. The particles are bonded to the fibrous matrix by means of a pyrolyzable binder, and after pyrolysis of this binder, there is obtained the desired product. The novel filters can be used in a variety of filtration and electrochemical separation devices.

INTRODUCTION

Electrochemical filters based on conductive porous media such as carbon and graphite are powerful devices which can serve for efficient purification of water, waste liquors and industrial effluents from a large variety of species. These include: salts, suspended material, heavy metals, organic material, macromolecules and bacteria.

The electrochemical filter operation is based on electrically motivated adsorption, namely electro adsorption, or electrodeposition. Electroadsorption is the process of binding a species from solution onto the electrode surface by virtue of the electrostatic and intermolecular forces that are operative at the electrode surface. In general, no chemical changes are exerted on the electroadsorbed species. Electrodeposition, on the other hand, is a process which chemically converts a dissolved species into a nonsoluble entity which is thereafter bound as such to the electrode surface. There are several basic properties necessary for a proper operation of the electrochemical bed:

a) High absorption capacity.
b) Fast adsorption rate.
c) Chemical stability within a wide temperature range.
d) Good electrical conductivity.
e) High solution permeability.

These properties are interrelated, as discussed in the following. The first two properties determine the minimum column length required for an efficient treatment of the liquids: it decreases as both adsorption capacity and rate increase. Since both electroadsorption and electrodeposition are surface processes, the larger the electrode surface area, the larger is the electrofiltration capacity. High surface area electrodes may be produced by using nonporous powder electrodes with surface areas inversely proportional to the square root of their diameters. However, as the size of the powder particles is decreased in order to obtain a higher specific surface area, the permeability of the electrode bed to aqueous media decreases and higher pressures have to be applied in order to drive the solution through the column. Therefore, large specific surface areas are preferentially gained with porous systems. Very large specific surface areas can be obtained by decreasing the pore size in the porous system. As an example, one can compare the non porous carbon blacks which comprise surface areas (originating from the geometric surface area of the round particles) that do not exceed 200 $m^2/gr$, with active porous carbons and have specific surface areas as high as 900-1200 $m^2/gr$. Decreasing the pore size will, however, slow down the rate of adsorption, and if the pore size is below the adsorbate size, adsorption will be completely ceased. As an extreme case, it was shown that when the pore size approaches the dimension of an hydrated ion in an aqueous solution, the solution conductivity drops by several orders of magnitude (1). A major optimization problem is therefore, encountered, and the pore size distribution function should be such as to a provide reasonably fast electroadsorption rate and a large capacity. Another problem related to electrochemical columns is the difficulty in achieving good electrical conductivity along the bed, particularly in large devices.

An objective of the present invention is to furnish a process for the preparation of improved carbon and/or graphite based beds for electrochemical separation and filtration devices. This process is adapted to cope with the abovementioned difficulties and thus, to bring about optimized beds. The novel filter media are characterized by considerably improved properties.

SUMMARY OF THE INVENTION

According to the invention there is used a combination of fibrous carbons or graphites with particulate carbons.

Fibrous carbons and graphites were shown (2) to be advantageous for electrochemical filters by virtue of the following properties:

1) The interstitials between the fibers are large, and thus, the permeability for solution is high;
2) The continuous fibrous framework provides good electronic conductivity along the bed;
3) They are nonexpensive in comparison with other types of beds and compatible with a very wide range of chemicals.

However, the fibrous structure by itself does not provide the sufficient specific surface area and the suitable pore size distribution which is necessary for obtaining a large adsorption capacity. For instance, the typical surface area for untreated graphite felts is in the range of 1-2 $m^2/gr$. Untreated carbon felts and cloths may show larger surface areas but with a pore system in the ultramicroporous range, which provides a very slow adsorption rate. On the other hand, carbon blacks and active charcoals have larger specific surface areas originating from the geometric surface area of the extremely fine nonporous carbon black particles and from the porous structure of the active charcoals. These carbons have at least two types of pore systems: one originates from the space between the closely packed carbon particles and is usually in the mesoporous range (50 to 1000 Å). The second originates from the micropore system (pore size below 50 Å) that exist within activated charcoals and may be as well introduced into carbon black particles by common methods such as controlled burn-off in an oxidative environment.

When the fibrous and the particulate carbons are combined in the proper proportions to form a composite, a novel type of electrochemical bed is formed which combines the high permeability of the former with the multiporous structure and the large specific surface area of the latter.

According to the process of the invention, the carbon black or active charcoal particles are attached to the fibrous carbon or graphite (which can be in the form of felt, cloth, skein or the like) by the use of a binder. The particulate carbon can be thermally activated to control pore size prior to or after their application to the fibrous matrix.

The fibrous or filament type substrate can be of fibrous carbon, or graphite, there can be used fibers of inert metals and these can be in the form of a felt, cloth (woven or non-woven), sponge, etc, providing a structure having adequate pathways for fluids and other liquid systems, providing adequate electric conductivity. The particulate carbon and/or graphite is attached to the matrix by means of a suitable binder. Amongst suitable binders there can be mentioned adhesives which can be pyrolyzed to provide a carbon-carbon or carbon-metal composite. Amongst suitable other binders there are sugars, gums, mucilages, various resins (epoxy resins and others) which undergo pyrolysis at a reasonable temperature.

The binder generally comprises from about 20 to 70 per cent by weight of the carbon particles, the preferred range being about 45 to 55 weight per cent. As after pyrolysis, the binder is converted to a carbonaceous substance, the nature of the binder has essentially no influence on the final product, and this includes electric conductivity.

Various experiments were carried out, and satisfactory results were obtained with various types of sugar and gums. Satisfactory results were also obtained with a variety of polymers.

A wide range of fiber diameter can be used. This will generally be in the micron range. Experiments were carried out within the range of from about 2 to 30 $\mu$ fiber diameter, the preferred range being about 6 to 12 $\mu$ diameter.

When a felt of fibers in the range of 6 to 12 $\mu$ diameter was produced, the interstices are of the order of 10 $\mu$. The carbon or graphite particles are of a wide range of particle size. This can vary between about 100 Å and about 5000 Å, although particles outside this range can also be used. There can be used particles of a wide range of sizes, and there can also be used nearly uniform particles, according to the properties of the final product which are desired.

There can be used a wide range of weight ratio of particles versus matrix. Generally, a quantity of particles providing a monolayer on the fibrous matrix gives good results. The particles are firmly attached to the binder and subsequent pyrolysis of the product converting the binder to carbon. Experiments were carried out comparing the effective surface area of the fibrous matrix with that obtained after attachment of particles of varying sizes. For example, a 10 $\mu$ diameter carbon fiber matrix in felt form had an area of 1 m²/g, whereas that of the same matrix with attached particles in the 800 Å range had a surface area of about 54 m²/g, and that with attached 0.5 $\mu$ particles had an effective area of about 10 m²/g.

It ought to be stressed that the flow resistance of the "naked" felt and that of the felt with attached particles was substantially the same. This is of considerable importance and is one of the unexpected advantageous results of the present invention.

EXAMPLES

Samples of graphite felt, 105 mg each, were used as a supporting bed for the carbon black particles. Suspensions of 10% carbon black dispersed in water containing a binder were used. The carbon particles, 800 Å in diameter, were applied onto the graphite felt by dipping in the suspension, applying vacuum to remove entrapped air bubbles followed by the application of atmospheric pressure to force the suspension into the innermost parts of the felt. A unit weight ratio was obtained between the carbon black and the felt.

Figure 1:
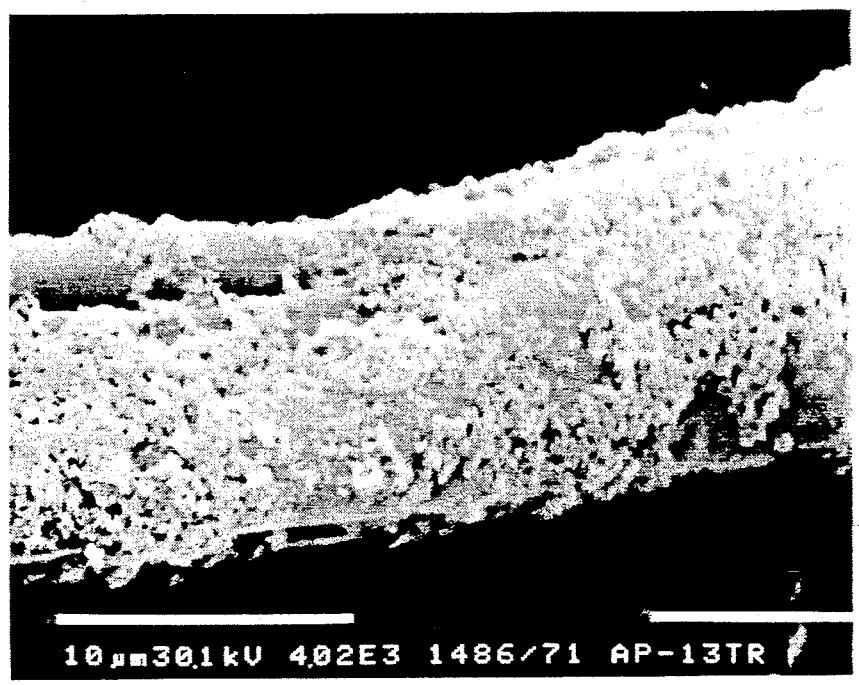
FIG. 1 is an electron microscope photograph of a fiber with attached carbon particles.

A scanning electron microscope magnification of the graphite fiber loaded with carbon black is depicted in FIG. 1. It is evident that most of the carbon particles are attached along the fibers thus providing a free pathway for fluids through the coarse porous matrix of the felt. Three carbon black loaded graphite felt samples were oxidized in an air stream at 450° C., at different treatment times.

The oxidized samples were analyzed for weight loss and surface area according to the BET model. The $N_2$ isotherms were analyzed by the procedure suggested by Pierce (3) for pore size distribution, and pore volume. Table I summarizes the characteristics of these samples.

TABLE I

| Treatment Time, hr. | Weight Loss % | BET Surface Area, m²/gr | Total Pore Volume*, cc/gr |
|---|---|---|---|
| Not treated | 0 | 53.6 | 0.14 |
| 2 | 2.7 | 171 | 0.13 |
| 4 | 8.3 | 316.7 | 0.20 |
| 16 | 65 | 657 | 0.61 |

*calculated in the 15–500 Å pore radii range.

Data in Table I refers to the carbon black only since the graphite felt does not contribute to the surface area and to the pore volume in the considered range of pore radii.

Figure 2:
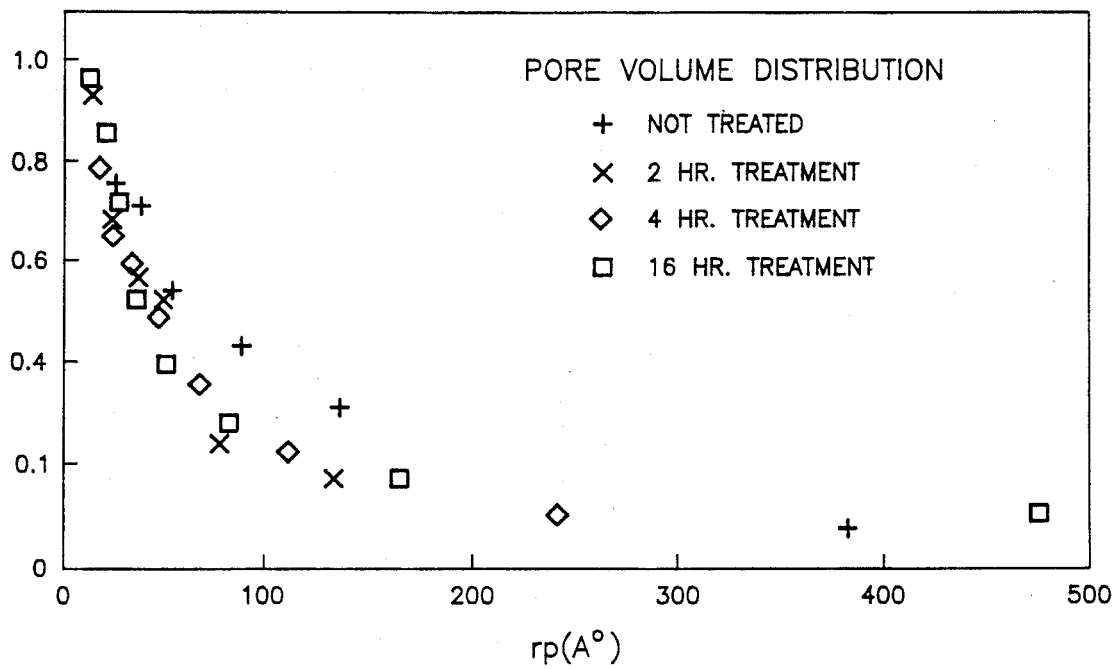
FIG. 2 is a diagram indicating pore volume distribution of a felt with carbon particles.
Figure 3:
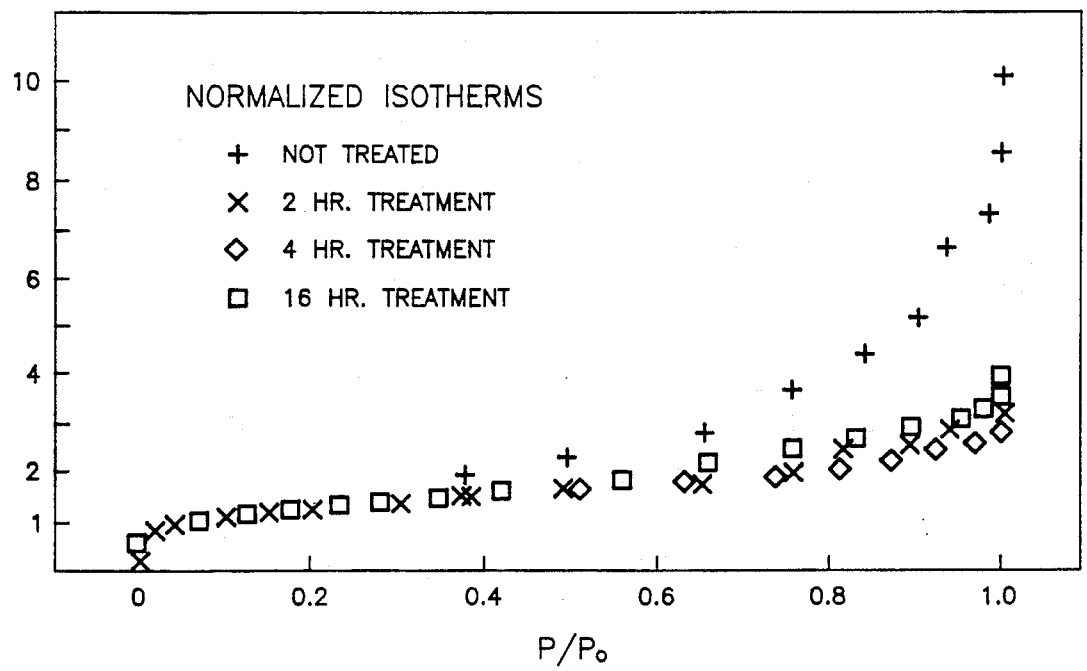
FIG. 3 is a diagram of normalized isotherms of the same felt of FIG. 2.

Isotherms for the four samples with nitrogen as an adsorbate are presented in FIG. 2. The amount adsorbed is shown in terms of numbers of monolayers covering the surface. From the fact that the isotherm of the untreated sample is much steeper than the others particularly at high pressures, it can be concluded that this sample contains a larger fraction of large pores. This conclusion gains additional support by comparing the calculated pore volume of the samples. This is shown in FIG. 3 whereby the pore volume normalized (divided by the total pore volume) is given as a function of the pore radii. It is evident that for the untreated sample, the pores dimension range above 40 Å constitute a larger fraction of the total pore volume as compared to the activated samples. These examples show that multiporous carbon beds can be obtained by application of oxidizable carbon on a fibrous graphite matrix followed by an oxidative treatment.

Upon inverting this procedure, i.e., preparing the activated carbon samples prior to the application on the fibrous matrix and mixing them in the proper ratio, it is possible to obtain a better control on the pore size distribution.

Figure 4:
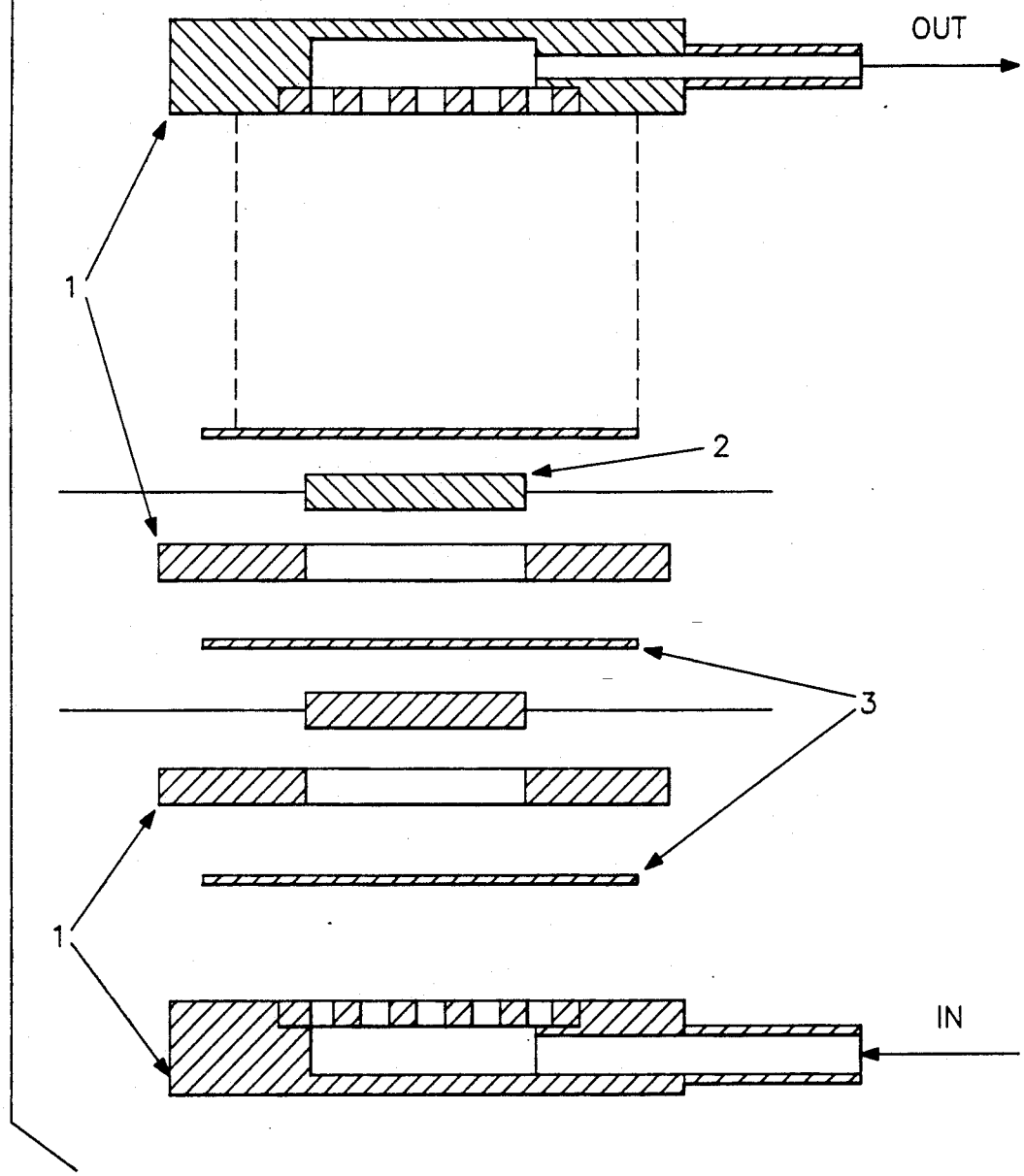
FIG. 4 is a schematic exploded cross-sectional side view of a flow cell used in experiments (not according to scale).

The invention is illustrated with reference to the enclosed schematical drawing, which is not according to scale, and in which FIG. 4 is an exploded side-view of the main components of a flow cell of the invention.

As illustrated in FIG. 4, the flow cell comprises an inlet compartment 11 (shown in partial section) and an outlet compartment 12, also shown in partial section, made of polypropylene, and going from bottom to top: a non-woven porous polypropylene separator disk 13, a graphite felt disk 14 with attached electrodes 15 and 16, a holder 17 for such disk, another separator disk 13, another holder 17, another graphite felt disk 14, and a further separator disk 13, and the outlet compartment 12. It is clear that any number of such sequences can be arranged in such cells.

An experimental device of the type illustrated comprises graphite felt disks of 4 cm diameter and 2 mm thickness to which carbon particles of an average of $0.5\mu$ diameter were attached. The weight increase as a result of such application was about 35% and typically the specific surface area of the felt increased from about 1 $m^2/g$ to about 10 $m^2/g$ (untreated versus treated felt). The typical applied voltage was between 2.0 V and 2.5 V, with flow rates in the range of 10 to 50 ml/minute, with a pressure drop of about 100-200 mb.

REFERENCES

1) J. Koresh and A. Soffer, J. Electroanalytical & Interfacial Electrochemistry, 127, 223 (1983).
2) Y. Oren, A. Soffer, Electrochimica Acta 28, 1649 (1983).
3) C. Pierce J. Phys. Chem.57, 149 (1953).

We claim:

1. A hydrophilic electrochemical filter matrix, consisting of:
   carbon fibers in the 2 $\mu$ to 30 $\mu$ fiber diameter range; and,
   carbon or graphite particles in the 100 Å to 5,000 Å particle size range attached to the surface of said carbon fibers, such attachment of said particles resulting in an increase of the surface area of the filter from the range of abut 1 $m^2/g$ to about 10 $m^2/g$, wherein the filter is characterized by a high electrical conductivity due to the carbon-particles to carbon fiber bond, and by a substantially free pathway of liquids flowing through the filter matrix.

2. The filter matrix of claim 1, wherein the carbon fibers have a diameter int he range of about 5 $\mu$ to 15 $\mu$ fiber diameter range.

3. The filter matrix of claim 1, wherein the particle size is about 800 Å.

4. The filter matrix of claim 1, wherein the particles are attached to the surface of the carbon fiber with a binder selected from the group consisting of sugars, resins, gums, an polymers.

* * * * *